United States Patent [19]

Nothofer et al.

[11] Patent Number: 4,847,721
[45] Date of Patent: * Jul. 11, 1989

[54] SAFETY DEVICE FOR A TOOL POWERED BY AN ELECTRIC MOTOR

[75] Inventors: Michael Nothofer, Stuttgart, Fed. Rep. of Germany; Malcolm J. Bishop; Nigel Bleasdale, both of Grossbritannien, England

[73] Assignee: C. & E. Fein GmbH & Co., Stuttgart, Fed. Rep. of Germany

[ * ] Notice: The portion of the term of this patent subsequent to Apr. 19, 2005 has been disclaimed.

[21] Appl. No.: 86,190

[22] Filed: Aug. 12, 1987

Related U.S. Application Data

[63] Continuation of Ser. No. 794,611, Nov. 4, 1985, abandoned.

[30] Foreign Application Priority Data

Feb. 7, 1985 [DE] Fed. Rep. of Germany ....... 3504074

[51] Int. Cl.[4] ............................................. H02H 7/093
[52] U.S. Cl. ........................................ 361/23; 361/86; 361/240; 361/242; 361/33; 318/434; 318/450; 318/463; 307/120

[58] Field of Search ...................... 361/23-25, 361/30, 31, 35, 54, 56, 57, 100-102, 160, 187, 194, 205, 236, 241, 240, 242; 307/116, 120; 318/310, 326, 327, 434, 450, 461, 463, 565, 783, 792, 798

[56] References Cited

U.S. PATENT DOCUMENTS

| | | | |
|---|---|---|---|
| 3,284,668 | 11/1966 | Heaslip | 361/194 X |
| 3,575,636 | 4/1971 | Etienne | 361/23 |
| 3,958,164 | 5/1976 | Hess | 361/33 X |
| 4,161,681 | 7/1979 | Rathje | 361/24 X |
| 4,196,462 | 4/1980 | Pohl | 361/33 |
| 4,412,158 | 10/1983 | Jefferson et al. | 318/461 X |
| 4,739,435 | 4/1988 | Nothofer | 361/86 X |

Primary Examiner—Todd E. Deboer
Attorney, Agent, or Firm—Max Fogiel

[57] ABSTRACT

A safety device for a tool powered by an electric motor. It has a main switch, electronic controls, and a tachometer-generator. In order to provide a device for switching off a motor as a function of motor speed that is simple and economical and that will retain the same nominal switch-off value for the total life of the device, a relay is wired in parallel with the motor and controls the supply of power to the motor through a relay contact.

4 Claims, 4 Drawing Sheets

SAFETY DEVICE FOR A TOOL POWERED BY AN ELECTRIC MOTOR

This is a continuation of Ser. No. 794,611 filed Nov. 4, 1985, now abandoned.

BACKGROUND OF THE INVENTION

The present invention relates to a safety device for a tool powered by an electric motor and having a main switch, electronic controls, and a tachometer-generator.

Known electric power tools are switched on and off through a main switch. The motor is controlled through electronic controls that receive an actual value from a tachometer-generator. When the controls fail, it can happen that the speed of the motor increases impermissibly. This means that, in right-angle grinders for example, the speed will increase so much that the grinding disk cracks. It would accordingly be desirable for the motor to shut off when the controls fail.

One solution is a centrifugal switch of the type described in German Pat. No. 638,928. This method of switching off a motor as a function of motor speed is however very complicated because of the mechanical parts involved, and hence expensive. The system is also very sensitive to contamination, which affects operating precision etc.

SUMMARY OF THE INVENTION

The object of the present invention is to provide a device for switching off a motor as a function of motor speed that is simple and economical and that will retain the same nominal switch-off value for the total life of the device.

This object is attained in accordance with the invention in that a relay is wired in parallel with the motor and controls the supply of power to the motor through a relay contact.

The relay is controlled through a tachometer-generator and a safety circuit downstream thereof.

The safety circuit consists of a resonance circuit or the tachometer-generator, a converter, a threshold switch, an ignition amplifier, and an output stage.

The pulse from the output stage activates. The relay, which is then both brought into a self-maintaining state and interrupts the supply of current to the motor. The relay remains self-maintaining until the main switch is interrupted.

Another practical result of the invention derives from safety circuit being in series with the main switch. The relay is simultaneously activated through the main switch, allowing current to be supplied to the motor. Once the maximum value assigned to the speed of the motor has been attained, a thyristor that is in parallel with the relay diverts the current past the relay, which drops out, so that the supply of current to the motor is interrupted even though the main switch is on.

Preferred embodiments of the invention will hereinafter be described with reference to the appended drawings. It is to be understood, however, that these are merely by way of example and that the scope of the protection sought for the invention is defined exclusively in the claims.

DETAILED DESCRIPTION OF THE PREFERRED EMBODIMENTS

Figure 1:
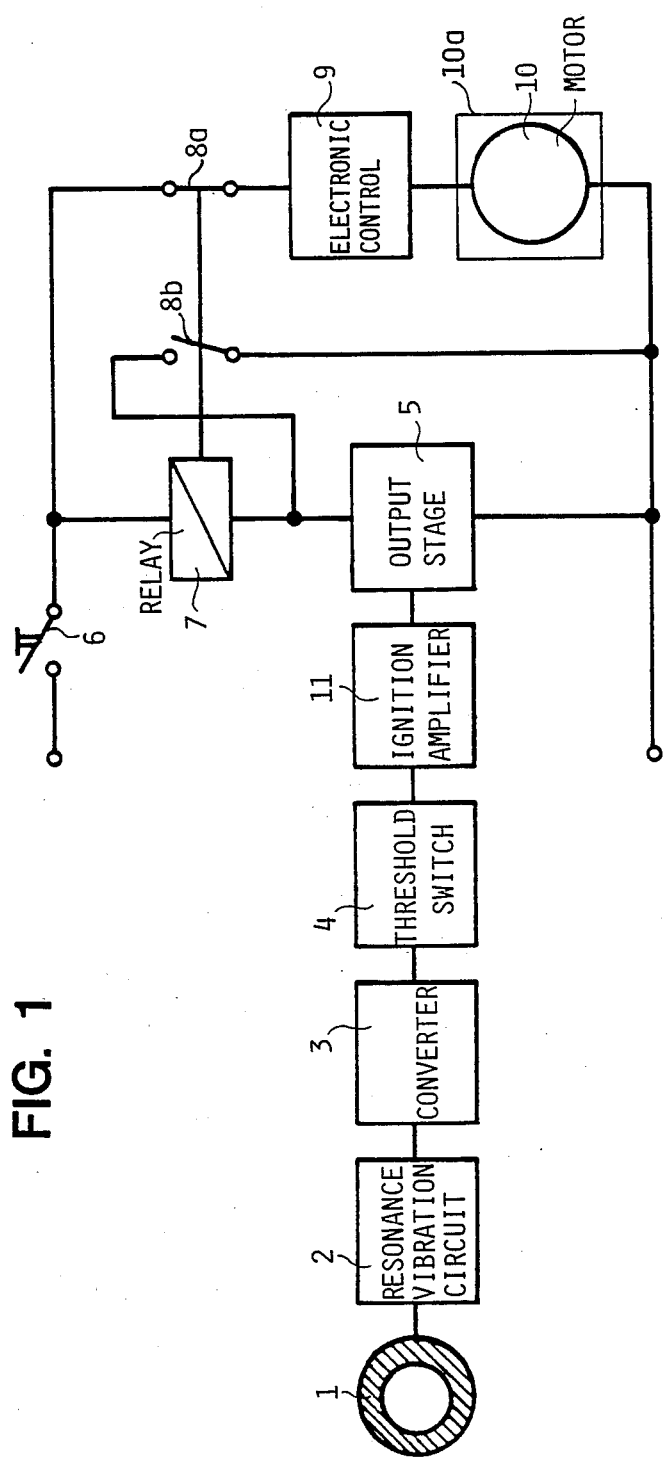
FIG. 1 is a block diagram of the safety device.

FIG. 1 is a block diagram of one embodiment of the safety device in accordance with the invention. A tachometer-generator 1 supplies an analog signal for the actual speed of a motor 10 in a tool 10a. The signal is converted into a direct-current signal in a resonance circuit 2 and a converter 3 and arrives at a threshold switch 4. If the value prescribed by threshold switch 4 is exceeded, an output stage 5 receives a signal from ignition amplifier 11. Output stage 5, which can be a triac for example, accordingly stops blocking access to a series-wired relay 7, which can accordingly turn on and interrupt the supply of current to motor 10 through a relay contact 8a. To prevent the motor from turning on again when the speed drops below the prescribed level, another relay contact 8b is also activated along with relay contact 8a when relay contact 8a turns on. Relay contact 8b bridges over output stage 5, maintaining the "on" state of relay 7 until main switch 6 opens.

Figure 2:
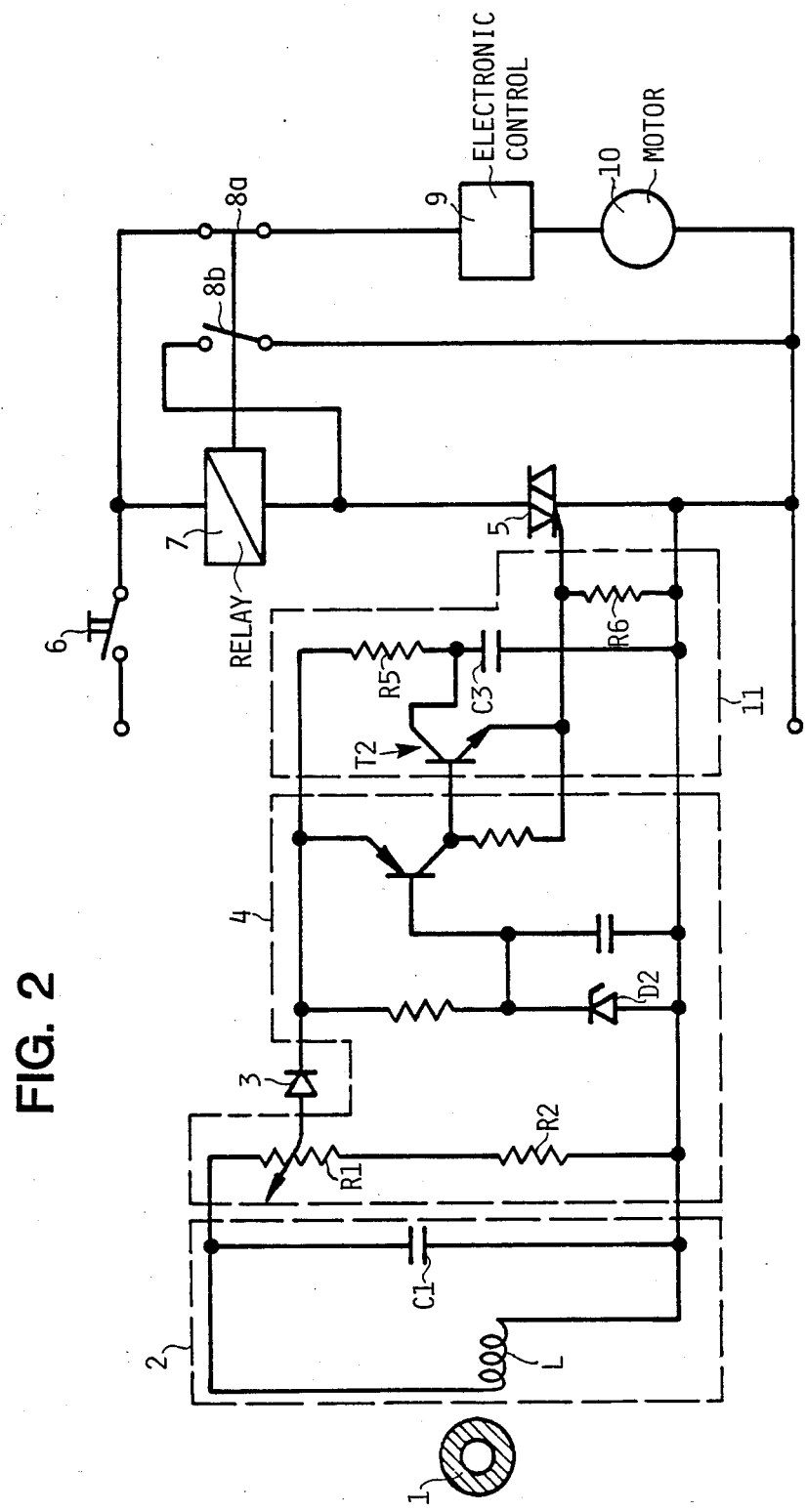
FIG. 2 is a detailed schematic of the circuitry illustrated in FIG. 1.

FIG. 2 is a detailed illustration of the circuitry in FIG. 1. Resonance circuit 2 consists of an inductor L and a capacitor C1. The resonance frequency of the circuit will depend on capacitor C1. The rapid increase in tachometer voltage around the switch-off point promotes the switching behavior of the directly downstream threshold switch 4. The induced tachometer voltage is rectified in converter 3 and can be adjusted with voltage distributors R1 and R2. The resistance prescribed for resistor R1 eliminates motor scatter. A measure for threshold voltage is provided by a Zener diode D2. The directly downstream amplifier circuit, which consists of a transistor T2, resistors R5 and R6, and a capcitor C3, ignites triac 5 when the threshold is arrived at.

Figure 3:
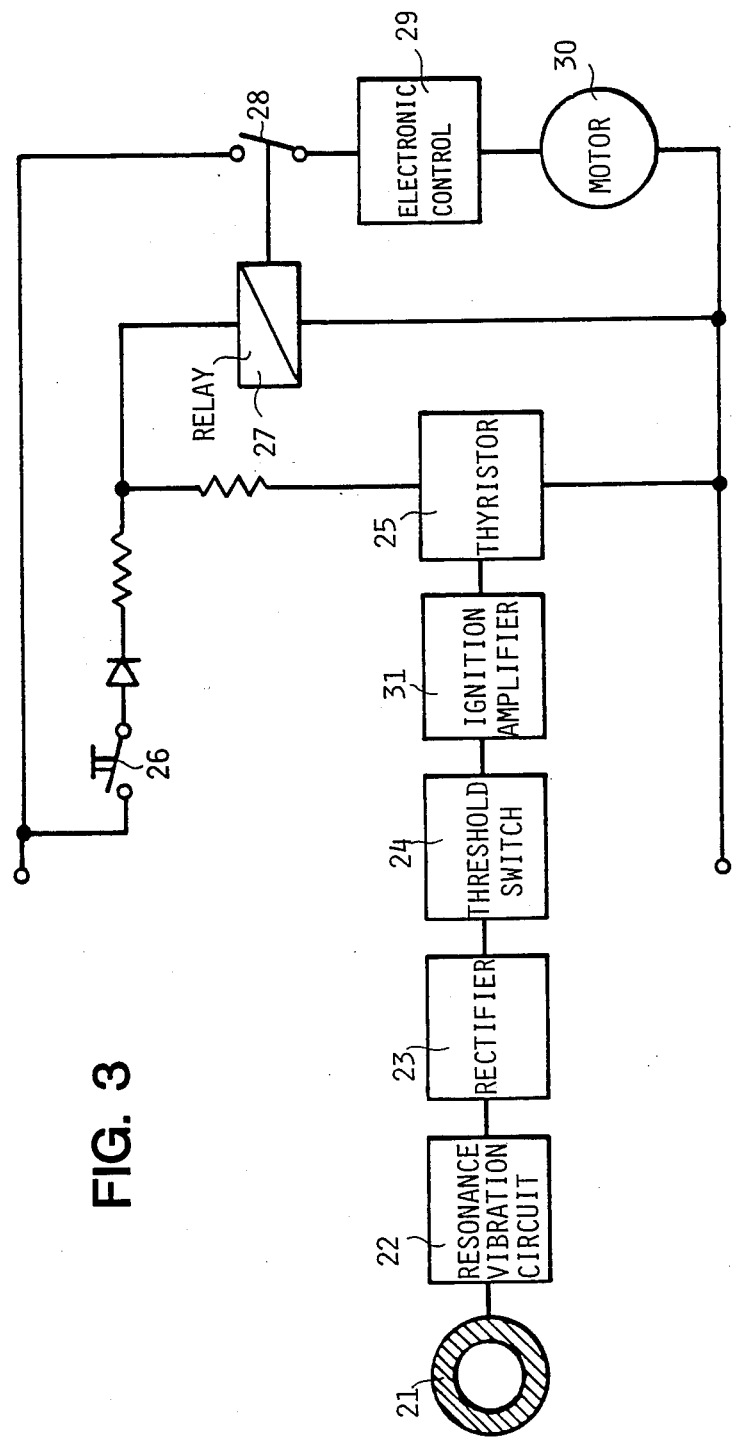
FIG. 3 is a block diagram of a variant of the device illustrated in FIG. 1.

FIG. 3 shows another embodiment of the safety device in accordance with the invention. This device consists in principle of the same elements as in the previous embodiment. The switch-off signal arrives at an ignition amplifier 31 through a tachometer-generator 21, a resonance-vibration circuit 22, a rectifier 23, an adjustable threshold switch 24. Amplifier 31 in this case, however, releases a signal to a thyristor 25 when the threshold is exceeded. Thyristor 25 becomes conductive, the potential at the parallel relay 27 drops, and relay contact 28 opens. The supply of current to motor 30. The current will now flow through main switch 26 by way of thyristor 25. The load circuit remains interrupted until main switch 26 is switched on again.

Figure 4:
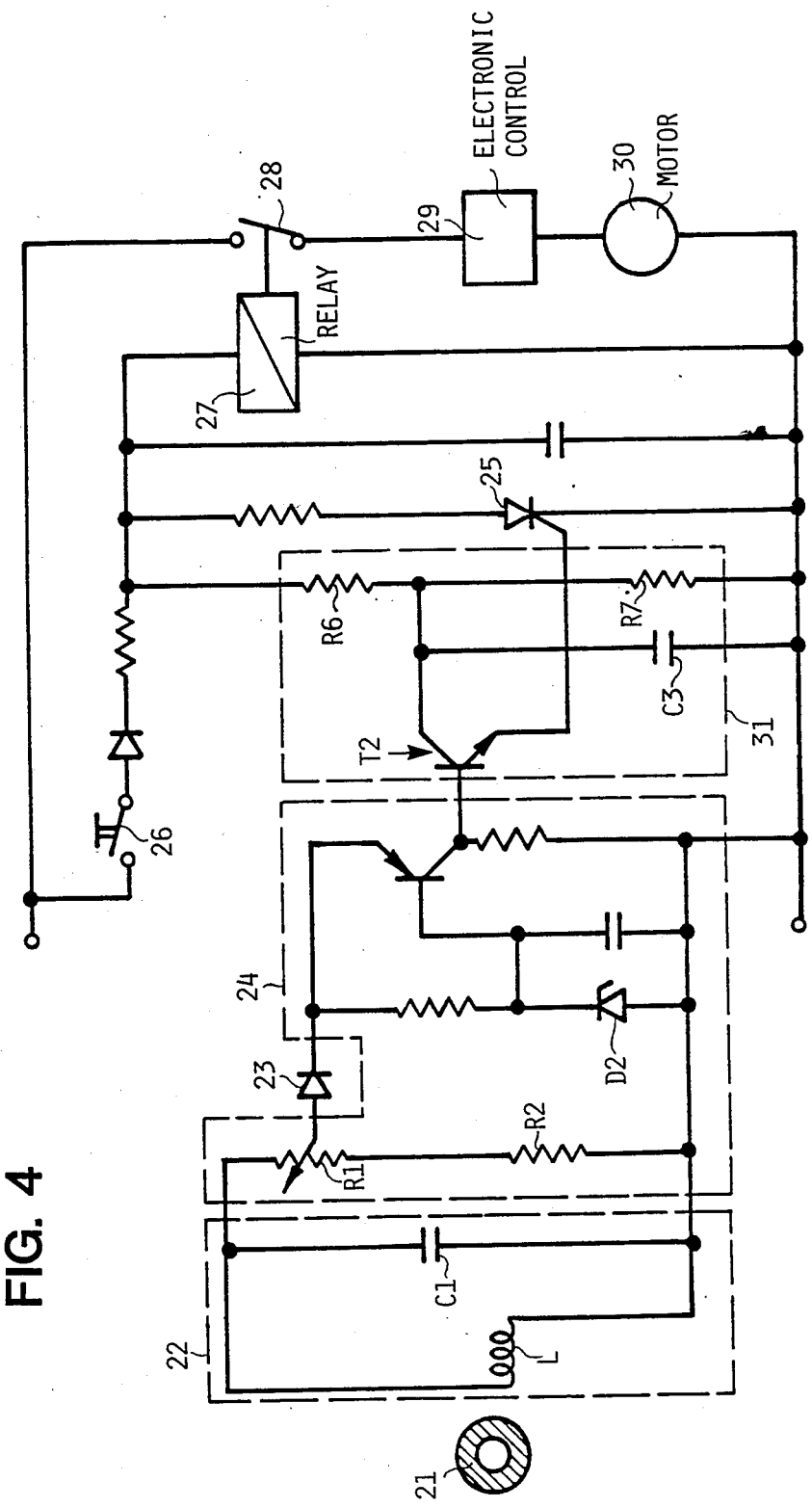
FIG. 4 is a detailed schematic of the circuitry illustrated in FIG. 3.

FIG. 4 is a detail of the embodiment illustrated in FIG. 3, which differs from that illustrated in FIG. 2 in that amplifier circuit 31 consists of a transistor T2, resistors R6 and R7, and a capacitor C3, which supplies the pulse that ignites thyristor 25.

It will be obvious to one skilled in the art that the thyristor 25 in this system can be replaced with a transistor circuit that can short-circuit the supply of current to relay 27.

The circuitry in both of the embodiments of the safety device disclosed herein represents an economical, reliable, and simple addition to existing electronic controls 9 or 29 for an electric power tool. It will protect the operator from the danger of a machine rotating out of control when its controls break down.

The invention has been described herein with reference to exemplary embodiments. It will be understood, however, that it is receptable of various modifications, which will offer themselves to those skilled in the art and which are intended to be encompassed within the protection sought for the invention as set forth in the appended claims.

What is claimed is:

1. Safety device for a tool, comprising: a tool and an electric motor for driving said tool; a relay with a contact on said relay, said relay controlling supply of power to said motor through said relay contact, said relay having a coil connected in series with means for actuating said coil, said motor being connected in series with control means and said control means being connected in series with said relay contact, the series circuit of said coil and said means for actuating said coil being connected substantially in parallel with the series circuit of said motor, said control means and said relay contact; said safety device switching off said motor when said control means malfunctions; tachometer-generator means and safety circuit means connected in series with said tachometer-generator means for controlling said relay; an auxiliary contact on said relay, said relay being switchable into a self-maintaining state through said auxiliary relay contact; said safety circuit comprising a resonance circuit connected to said tachometer-generator means; a rectifier connected to said resonance circuit, an adjustable threshold switch connected to said rectifier, an ignition amplifier connected to said threshold switch, said means for actuating said coil comprising a thyristor connected to said ignition amplifier, said thyristor being also connected in series with said coil of said relay.

2. Safety device for a tool, comprising: a tool and an electric motor for driving said tool; a relay with a contact on said relay, said relay controlling supply of power to said motor through said relay contact, said relay having a coil connected in series with means for actuating said coil, said motor being connected in series with control means and said control means being connected in series with said relay contact, the series circuit of said coil and said means for actuating said coil being connected substantially in parallel with the series circuit of said motor, said control means and said relay contact; said safety device switching off said motor when said control means malfunctions; tachometer-generator means and safety circuit means connected in series with said tachometer-generator means for controlling said relay; an auxiliary contact on said relay, said relay being switchable into a self-maintaining state through said auxiliary relay contact; said safety circuit comprising a resonance circuit connected to said tachometer-generator means; a rectifier connected to said resonance circuit, an adjustable threshold switch connected to said rectifier, an ignition amplifier connected to said threshold switch, said means for actuating said coil comprising a thyristor connected to said ignition amplifier, said thyristor being also connected in series with said coil of said relay; said tachometer-generator means supplying an analog signal dependent on actual motor speed, said analog signal being converted to a direct-current signal by said rectifier and transmitted to said threshold switch; said threshold switch applying a signal to said ignition amplifier when said signal received by said threshold switch exceeds a predetermined limit; said resonance circuit comprising an inductor and a capacitor for determining frequency of said resonance circuit; said threshold switch being influenced by rapid increase in voltage from said tachometer-generator means about said predetermined limit; said voltage from said tachometer-generator means being rectified and adjusted by said rectifier for eliminating motor scatter; a zener diode for determining threshold voltage corresponding to said predetermined limit.

3. Safety device for a tool, comprising: a tool and an electric motor for driving said tool; a relay with a contact on said relay, said relay controlling supply of power to said motor through said relay contact, said relay having a coil connected in series with means for actuating said coil, said motor being connected in series with control means and said control means being connected in series with said relay contact, the series circuit of said coil and said means for actuating said coil being connected substantially in parallel with the series circuit of said motor, said control means and said relay contact; said safety device switching off said motor automatically when said control means malfunctions; tachometer-generator means and safety circuit means connected in series with said tachometer-generator means for controlling said relay; said safety circuit comprising a resonance circuit connected to said tachometer-generator means; a rectifier connected to said resonance circuit, an adjustable threshold switch connected to said rectifier, an ignition amplifier connected to said threshold switch, said means for actuating said coil comprising a thyristor connected to said ignition amplifier, said thyristor being also connected in series with said coil of said relay.

4. Safety device for a tool, comprising: a tool and an electric motor for driving said tool; a relay with a contact on said relay, said relay controlling supply of power to said motor through said relay contact, said relay having a coil connected in series with means for actuating said coil, said motor being connected in series with control means and said control means being connected in series with said relay contact, the series circuit of said coil and said means for actuating said coil being connected substantially in parallel with the series circuit of said motor, said control means and said relay contact; said safety device switching off said motor when said control means malfunctions; tachometer-generator means and safety circuit means connected in series with said tachometer-generator means for controlling said relay; an auxiliary contact on said relay, said relay being switchable into a self-maintaining state through said auxiliary relay contact; said safety circuit comprising a resonance circuit connected to said tachometer-generator means; a rectifier connected to said resonance circuit, an adjustable threshold switch connected to said rectifier, an ignition amplifier connected to said threshold switch; and an output stage connected to said ignition amplifier, said means for actuating said coil comprising said output stage, said means for actuating said coil comprising a thyristor connected to said ignition amplifier, said thyristor being also connected in series with said coil of said relay.

* * * * *